United States Patent [19]

Ohnishi et al.

[11] Patent Number: 5,144,464

[45] Date of Patent: Sep. 1, 1992

[54] POLYMER LIQUID CRYSTAL DEVICE

[75] Inventors: Toshikazu Ohnishi, Tokyo; Shuzo Kaneko, Yokohama; Takashi Kai, Hadano, all of Japan

[73] Assignee: Canon Kabushiki Kaisha, Tokyo, Japan

[21] Appl. No.: 829,544

[22] Filed: Feb. 4, 1992

Related U.S. Application Data

[63] Continuation of Ser. No. 538,729, Jun. 15, 1990, abandoned.

[30] Foreign Application Priority Data

Jul. 10, 1989 [JP] Japan .................. 1-175619

[51] Int. Cl.[5] ............................................. G02F 1/13
[52] U.S. Cl. ........................................ 359/98; 359/43; 359/45; 359/68; 346/76 PH
[58] Field of Search ............... 346/108, 135.1, 76 PH, 346/76 L; 430/945, 20, 286; 359/43, 45, 68, 96, 98

[56] References Cited

U.S. PATENT DOCUMENTS

| | | | |
|---|---|---|---|
| 4,196,974 | 4/1980 | Hareng et al. | 350/349 |
| 4,293,435 | 10/1981 | Portugall et al. | 350/352 |
| 4,631,328 | 12/1986 | Ringsdorf et al. | 350/349 |
| 4,702,558 | 10/1987 | Coles et al. | 350/330 |
| 4,702,945 | 10/1987 | Etzbach et al. | 350/330 |
| 4,904,066 | 2/1990 | Gray et al. | 350/350 S |
| 4,965,591 | 10/1990 | Kurabayashi et al. | 350/330 |
| 5,038,166 | 8/1991 | Isaka et al. | 346/76 PH |
| 5,059,000 | 10/1991 | Kaneko et al. | 350/351 |

FOREIGN PATENT DOCUMENTS

| | | |
|---|---|---|
| 0321982 | 6/1989 | European Pat. Off. |
| 0013428 | 1/1982 | Japan .................. 350/349 |

OTHER PUBLICATIONS

Patent Abstracts of Japan, vol. 12, No. 483, (Dec. 16, 1988), 63-198002.

Primary Examiner—Rolf Hille
Assistant Examiner—Tan Ho
Attorney, Agent, or Firm—Fitzpatrick, Cella, Harper & Scinto

[57] ABSTRACT

A polymer liquid crystal device is formed by a color polymer liquid crystal layer, generally disposed on a substrate. The color polymer liquid crystal layer includes a plurality of minute polymer liquid crystal elements, which in turn comprise plural species of color polymer liquid crystals colored in at least two colors and disposed regularly or irregularly in the layer so that the polymer liquid crystal elements emit scattered light in intensities which are selectively controlled thermally to effect a display with scattered light. In the color polymer liquid crystal layer, a color of the polymer liquid crystal elements emitting the longest wavelength scattered light are disposed in a larger areal proportion than the other color of the polymer liquid crystal elements so as to correct color balance in compensation for a difference in spectral luminous efficiency or differences in scattering intensity and scattering angle depending on colors during a display using scattered light.

23 Claims, 6 Drawing Sheets

POLYMER LIQUID CRYSTAL DEVICE

This application is a continuation of application Ser. No. 07/538,729 filed Jun. 5, 1990, now abandoned.

FIELD OF THE INVENTION AND RELATED ART

The present invention relates to an image forming medium capable of outputting or displaying an image based on image signals such as those outputted from a magnetic memory, an optical memory, a computer, etc., or facsimile signals, and particularly to such an image forming medium capable of outputting or displaying a color image.

Hitherto, a display comprising a polymer liquid crystal has been known for displaying a still image. A polymer liquid crystal has advantages that it can be formed into a film of a large area and thus can easily constitute a flat display and moreover it can provide a memory image which is clear and stable as comparable to an image on paper. Further, the optical characteristic of a polymer liquid crystal can be reversibly changed by utilization of heat, electric field, etc., so that it can be used for repetitive display and erasure. Particularly, light scattering by a polymer liquid crystal in a polydomain state can provide a display image with little viewing angle-dependence.

Further, it has been proposed to form a layer of a polymer liquid crystal containing colorants for color selection, as an image forming medium or device comprising a polymer liquid crystal for color image display. Such a device has advantages that it is constituted in a simple structure, it does not require alignment between the polymer liquid crystal layer and a color filter and it is free from viewing angle-dependence due to lamination of a filter and a polymer liquid crystal layer, because a color filter is not necessary.

It has been however found that such an image forming device utilizing light scattering through a polymer liquid crystal is accompanied with wavelength-dependence of light scattering angle and light scattering efficiency, so that correction of color balance in display images is necessary. Further, correction of color balance is also required because of a difference in spectral luminous efficiency. Thus, a simple method of correction applicable to an image forming medium using a polymer liquid crystal is expected.

SUMMARY OF THE INVENTION

The present invention has been accomplished in view of the above problems and particularly aims at providing an image forming medium using a polymer liquid crystal which can provide good display images through simple correction of color balance corresponding to a difference in spectral luminous efficiency or differences in scattering intensity and scattering angle depending on colors during a display using scattered light.

According to the present invention, there is provided a polymer liquid crystal device, comprising a color polymer liquid crystal layer, generally disposed on a substrate, which color polymer liquid crystal layer includes a plurality of minute polymer liquid crystal elements comprising plural species of color polymer liquid crystals colored in at least two colors and disposed regularly or irregularly in the layer so that the polymer liquid crystal elements emit scattered light in intensities which are selectively controlled thermally to effect a display with scattered light; wherein a color of the polymer liquid crystal elements emitting the largest wavelength scattered light are disposed in a larger areal proportion than the other color of the polymer liquid crystal elements.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1A:
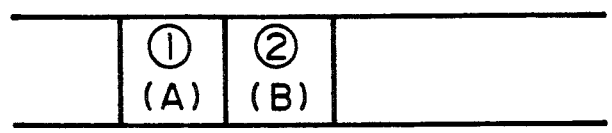
FIGS. 1A–1E are explanatory views for illustrating a recording principle by using an embodiment of the polymer liquid crystal device according to the invention.

Polymer liquid crystals suitably used in the present invention may be thermotropic liquid crystals which show nematic, smectic or cholesteric phase as a mesophase. A thermotropic polymer liquid crystal has advantages that it can be formed into a thin film and can easily retain a recorded state compared with a low-molecular weight liquid crystal.

Thermotropic polymer liquid crystals (hereinafter simply referred to as "polymer liquid crystal") may be classified into the following two types.

(1) Main chain-type in which mesogens or relatively rigid long atomic groups are connected with a flexible chain.

(2) Side chain-type which includes side chains comprising a mesogen or a relatively rigid long atomic group.

These polymer liquid crystals can be used singly or in mixture of two or more species. It is also possible to use a mixture of a polymer liquid crystal and a low-molecular weight liquid crystal.

Specific examples of the polymer liquid crystal which may be used in the present invention include those represented by the following formulas but they are not exhaustive.

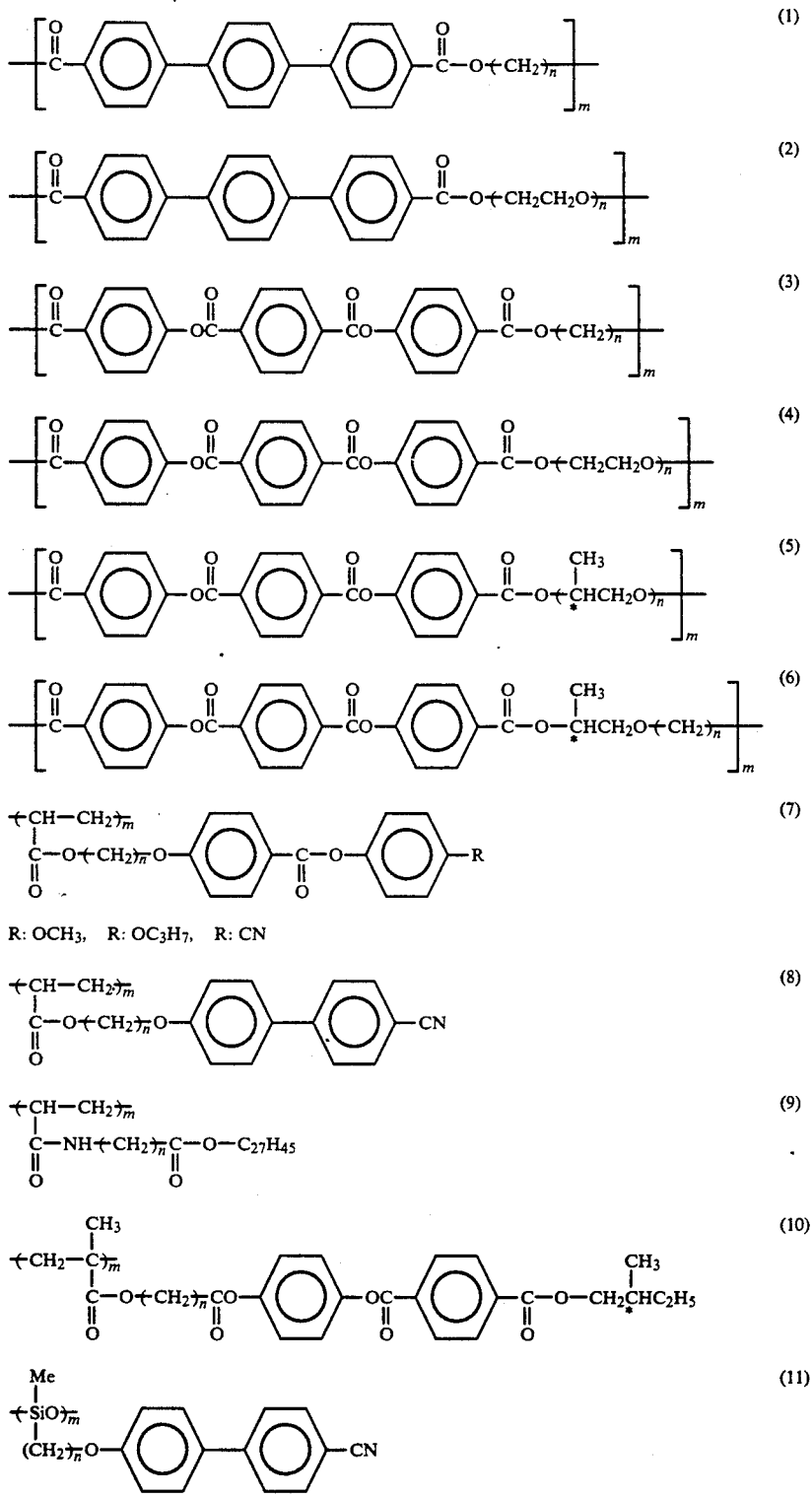

In the above formulas, n represents an integer of from 2-12, and m represents an integer of 2-100.

A polymer liquid crystal as described above has a property of retaining its structure below its glass transition temperature so that it can be used, e.g., in the following recording mode.

Liquid crystal polydomain state (light scattering state) ⟷ Isotropic state (light non-scattering state or transparent state).

According to this recording mode, a polymer liquid crystal is first held in a polydomain state in a liquid crystal phase comprising a large number of domains (minute regions). Then, the polymer liquid crystal is heated to a temperature at which it assumes an isotropic phase and then quickly cooled to below the glass transition temperature to retain the isotropic state, whereby a recording is effected.

The resultant recorded region can be restored to the original polydomain state if it is heated to a temperature giving the isotropic phase or in the neighborhood thereof and then gradually cooled. Further, it is also possible to use a recording mode wherein an original, non-recorded state is formed by a light non-scattering state and a recorded state is formed in a light scattering state.

In the present invention, the polymer liquid crystal layer can contain an additive, such as an antioxidant or a nucleating agent.

In the present invention, it is necessary to add a colorant into the polymer liquid crystal layer constituting the image forming medium for color display. The colorant may for example be a dichroic colorant as conventionally used in a low-molecular weight liquid crystal or another dye or pigment. Further, in case where the polymer liquid crystal is heated by absorption of light such as laser light, it is possible to incorporate a light-absorbing dye (particularly, a laser light-absorbing dye) in addition to the dye or colorant for color display in an amount not giving ill effect to color display but giving an appropriate degree of sensitivity.

The dye or pigment may be added in a proportion of generally 0.01-30 wt. %, preferably 0.1 -20 wt. %, more preferably 0.1-10 wt. %, with respect to the polymer liquid crystal.

It is preferred that the respective polymer liquid crystals in different colors contain colorants in substantially identical proportions of addition, i.e., within ±5% from each other, because the amount of addition of a colorant can cause a substantial change in phase transition temperature or mesomorphic characteristic of a polymer liquid crystal.

In the present invention, it is further possible to introduce a colorant in a form that it is chemically bonded to a polymer liquid crystal. For example, a colorant structure may be copolymerized into a side chain of a side chain-type polymer liquid crystal. This is particularly preferred since the diffusion of the colorant can be completely suppressed compared with ordinary addition of a colorant.

In the polymer liquid crystal device of the present invention, plural species of differently colored polymer liquid crystals are disposed in minute elements which are arranged regularly or at random to form a single layer. The thus formed polymer liquid crystal layer may have a thickness of 1-20 $\mu$m, preferably 1-10 $\mu$m.

In the present invention, a species of polymer liquid crystal containing a colorant showing the longest visible light transmission wavelength, i.e., the longest wavelength of the scattered light for display, is disposed in minute elements giving an area which is larger than that given by another species of polymer liquid crystal in a different color of a shorter wavelength.

The size of each minute element may be 1 $\mu m^2$ or larger, preferably 10 $\mu m^2$ or larger. The upper limit in size of each minute element is determined from the standpoint of not giving a too coarse appearance and greatly depends on the entire size of the polymer liquid crystal device or a distance for viewing the device. The sizes of minute elements for the respective colors may be the same or different. Substantially the same size is preferred.

The areal change for the color polymer liquid crystals described above is given because the display image is formed by light scattered by the polymer liquid crystal in the present invention.

More specifically, the scattering intensity and the scattering angle of scattered light depend on the wavelength of the light and there is a tendency that a longer wavelength of light provides a smaller scattering light intensity and a smaller scattering angle. Accordingly, the intensity and angle of scattered light from a colored polymer liquid crystal containing a colorant vary depending on the color, so that the resultant difference is required to be corrected in order to provide a display image with a good color tone. For this reason, a color polymer liquid crystal scattering a light fraction of the longest wavelength is caused to have a larger areal ratio to compensate for the decrease in scattering intensity and scattering angle. For example, in the case of a polymer liquid crystal device using polymer liquid crystals containing three colorants of blue, green and red, the red polymer liquid crystal is caused to occupy a larger area than any of the blue and green polymer liquid crystal. Further, the green polymer liquid crystal may occupy a smaller area than the blue polymer liquid crystal due to correction of a difference in visual intensity.

In the present invention, the areal proportion of a color polymer liquid crystal refers to the proportion of a total area of minute elements of the color polymer liquid crystal contained in a certain region of the polymer liquid crystal layer.

It is theoretically possible to effect such correction of color balance by changing the kind and amount of a colorant to be added, but there is practically a restriction in selecting the kind and amount of a colorant soluble in a polymer liquid crystal without giving ill effects to mesomorphic properties in a device having a single layer of colored polymer liquid crystals. Accordingly, in the present invention, the areal proportions of color polymer liquid crystals are changed to effect a simple correction of color balance for giving a display of a good color tone.

More specifically, in case where two colors of polymer liquid crystals are considered, a polymer liquid crystal in a color of the longest wavelength may occupy an area which is 1.1-20 times, preferably 1.5 -15 times, further preferably 2-10 times the area occupied by a polymer liquid crystal in another color of a minimum areal proportion. If polymer liquid crystals in a third color, a fourth color and so on with intermediate wavelengths are used, these colors of polymer liquid crystals may generally occupy intermediate areal proportions.

Even a color of polymer liquid crystal having a minimum areal proportion should have an areal proportion of 3% or more, preferably 10% or more, so that it can substantially participate in effective display.

It is necessary to heat and selectively cause a transparent-light scattering state change of a color polymer liquid crystal. For this purpose, the following methods may for example be used.

Figure 1B:
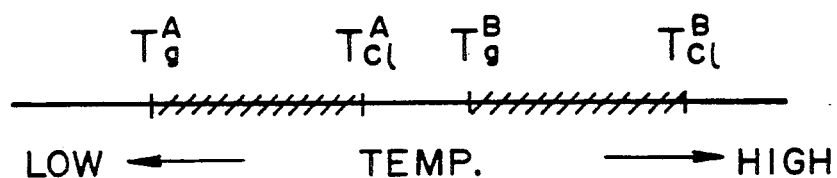

(a) Polymer liquid crystals for different colors are selected so as to provide mutually different liquid crystal or liquid-crystallization temperature regions and conditions of rapid and gradual cooling are selected to selectively cause a transparent-light scattering state change for a color polymer liquid crystal. More specifically, referring to FIG. 1A, it is assumed that polymer liquid crystals A and B are used to constitute minute elements ① and ②, respectively, and have glass transition points ($Tg^A$ and $Tg^B$) and isotropic transition points ($Tcl^A$ and $Tcl^B$) satisfying relationship as shown in FIG. 1B. Herein, the glass transition temperature (Tg) and isotropic transition temperature (Tcl) of a polymer liquid crystal are defined as the temperatures of respective transition as measured by a DSC(differential scanning calorimeter) on temperature decrease at a rate of 5° C./min. When a region containing the elements ① and ② which are both initially retained in a light scattering state (liquid crystal polydomains) is heated above $Tcl^B$ and then rapidly cooled below $Tg^A$, the elements ① and ② are held in a transparent (isotropic) state. Subsequently, if the region is heated to a temperature between $Tcl^A$ and $Tg^B$ and then gradually cooled below $Tg^A$, only the element ① is selectively restored into the light scattering state.

On the other hand, if a region containing elements which are both initially retained in a light scattering state are heated to a temperature between $Tcl^A$ and $Tg^B$ and then rapidly cooled below $Tg^A$, only the element ① can be changed into a transparent state.

Further, if the region is heated above $Tcl^B$ and then gradually cooled below $Tg^A$, both the elements ① and ② are changed into a light scattering state.

Figure 1C:
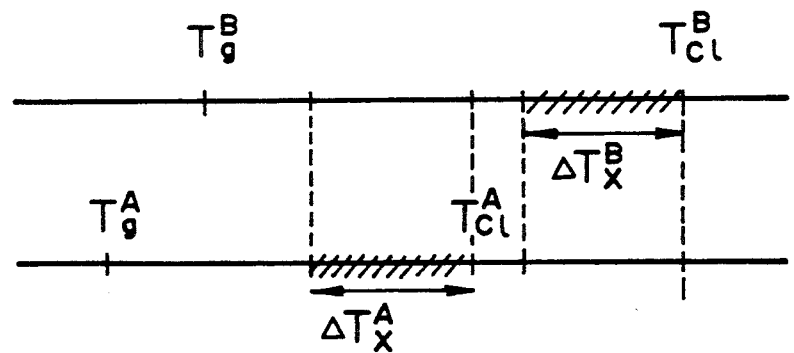

FIG. 1B shows a relationship in which the liquid crystal phase temperature regions ($Tg^A$-$Tcl^A$ and $Tg^B$-$Tcl^B$) for the two polymer liquid crystals A and B are completely separated from each other. Even if these liquid crystal phase temperature range are not completely separated from each other, i.e., $Tcl^A > Tg^B$, it is sufficient that the liquid crystallization temperature regions $\Delta Tx^A$ and $\Delta Tx^B$ of the polymer liquid crystals do not overlap but are separated from each other as shown in FIG. 1C. Herein, the liquid crystallization temperature range $\Delta Tx$ of a polymer liquid crystal is defined as a temperature range in which the decrease in parallel light transmittance caused during temperature decrease at a rate of 5° C./min reaches 90% of the decrease in parallel transmittance through temperature decrease from Tcl to Tg.

It is preferred that the difference between $Tcl^A$ and $Tcl^B$ is 10° C. or more, and a larger difference between $Tcl^A$ and $Tcl^B$ makes the recording easier.

Figures 1D, 1E:
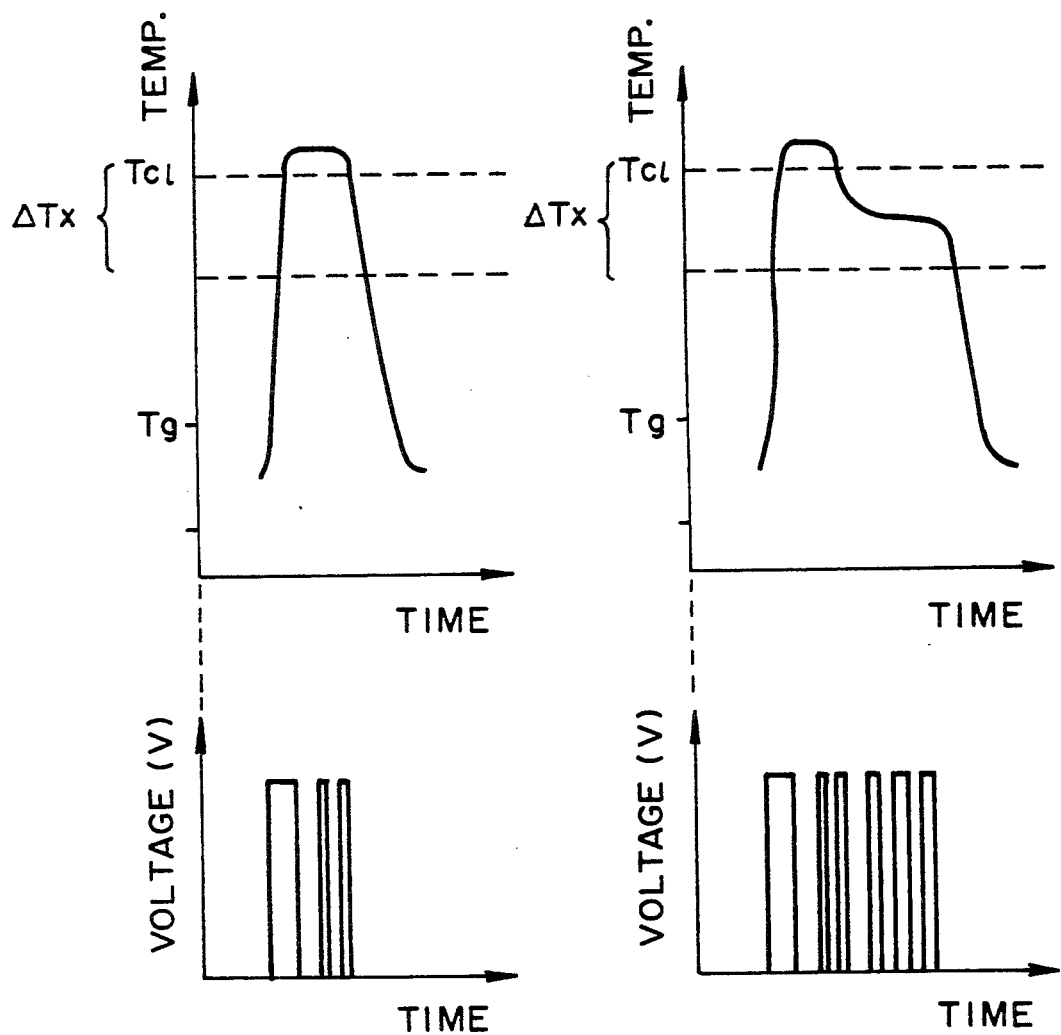

In the present invention, if the liquid crystal or liquid-crystallization temperature regions are separated from each other in the polymer liquid crystal layer, heat application to the layer may be effected by a thermal head. More specifically, by changing drive voltages applied to a thermal head as shown in FIGS. 1D and 1E, the temperature of the polymer liquid crystal layer can be changed stepwise or continuously.

It is further possible to realize an intermediate tone or a gray scale by controlling the time in which the polymer liquid crystal is held in the liwuid crystallization temperature range $\Delta Tx$ so as to continuously change the light scattering intensity by the polymer liquid crystal.

(b) According to another method, minute elements of different colors are selectively heated by irradiation with lights of different wavelengths. It is possible to use the colorants for color display also as light-absorbing dyes. In this case, however, a laser having an emission wavelength in the visible region (such as He-N, Ar+ laser, etc.) is required as the light source, so that inconveniences in respects of apparatus and driving are encountered. For this reason, it is preferred to add a light-absorbing dye showing an absorption in the red or near infrared region in addition to a colorant for color display, so that a semiconductor laser can be used. In this case, it is desired that absorption wavelengths for different light-absorbing dyes cause little crosstalk and the addition of such a light-absorbing dye will not adversely affect the color display characteristic.

Hereinbelow, the present invention will be explained more specifically based on Examples.

EXAMPLE 1

A dichroic dye (LSR-405, mfd. by Mitsubishi Kasei K.K.) was mixed in a proportion of 2 wt. % with a polymer liquid crystal of the following structural formula (I):

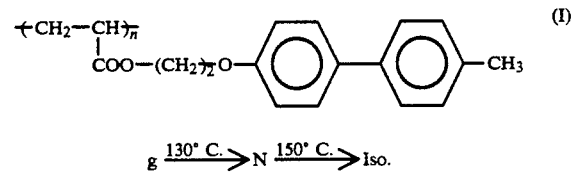

The mixture was dissolved in dichloroethane and then dried under vacuum for removal of the solvent to obtain a red polymer liquid crystal composition containing the dichroic dye uniformly mixed therewith.

On the other hand, a dichroic dye (LSB-278, mfd. by Mitsubishi Kasei K.K.) was added in a proportion of 2 wt. % to a polymer liquid crystal of the following structural formula (II):

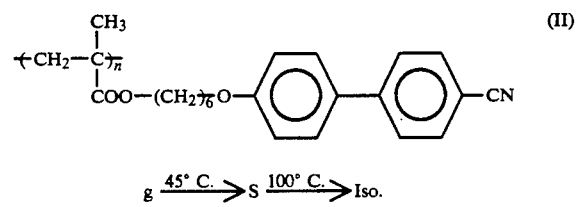

whereby a blue polymer liquid crystal composition was obtained.

The thus obtained two polymer liquid crystal compositions were respectively pulverized and classified to obtain two types of color particles each having a number-average particle size of 8 μm. The resultant red and blue particles were blended in a weight ratio of 1.5:1 and applied by electrostatic spraying onto a 50 μm-thick polyester film to form a single coating layer.

Figure 2:
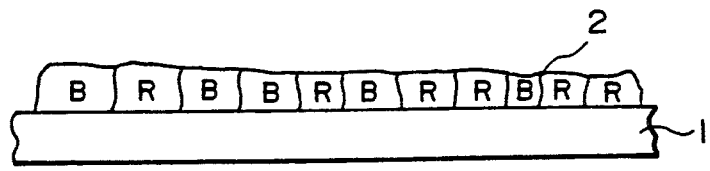
FIG. 2 is a schematic sectional view of a polymer liquid crystal device prepared according to Example 1 of the invention described hereinafter.

Then, the coated film was heated to 150° C. and passed through rollers coated with polytetrafluoroethylene so that the color particles were pressure-bonded to the polyester sheet. As a result, there was obtained a polymer liquid crystal device as shown in FIG. 2 wherein the polyester film 1 was coated with a color polymer liquid crystal layer 2 in which red (R) and blue (B) polymer liquid crystal elements were arranged at random.

Figure 3:
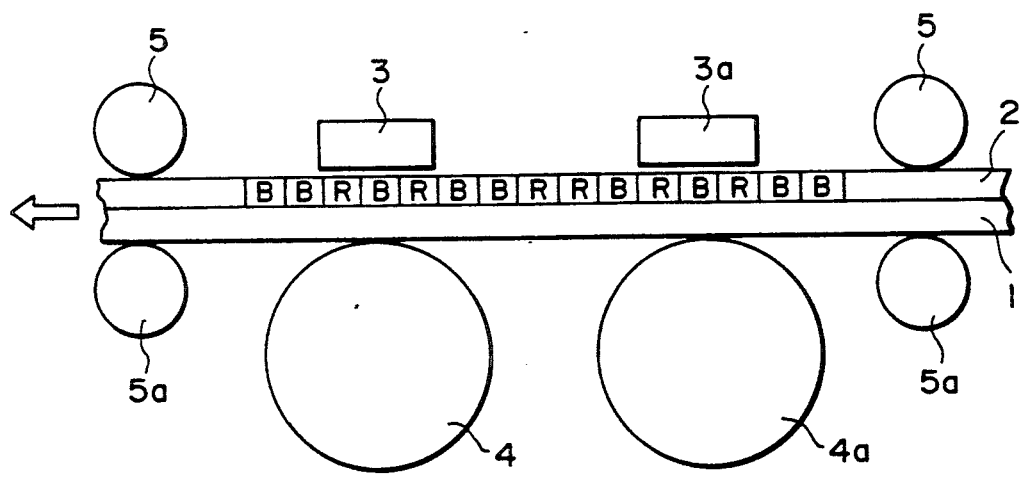
FIG. 3 is a schematic side view of a recording apparatus including the polymer liquid crystal device according to Example 1.

The resultant polymer liquid crystal device was subjected to image recording in a system shown in FIG. 3 including thermal heads 3, 3a, platen rollers 4, 4a and feeding rollers 5, 5a.

Initially, the color polymer liquid crystal elements R and B were all held in a light-scattering state. Then, the thermal heads 3 and 3a were used in four modes (a)-(d) as shown in the following Table 1 so as to selectively make transparent or light-scattering the blue (B) and red (R) polymer liquid crystal elements depending on given image signals.

TABLE 1

| Mode | Thermal head 3 | Thermal head 3a | State of color elements |
|---|---|---|---|
| (a) | Heated above 150° C. and then below 45° C. (Figure 4A) | Not heated | B = transparent R = transparent |
| (b) | Heated above 150° C. and then rapidly cooled below 45° C. | Heated to 100–120° C. and then gradually cooled below 45° C. (Figure 4B) | B = scattering R = transparent |
| (c) | Heated to 100–120° C. and then rapidly cooled below 45° C. | Not heated | B = transparent R = scattering |
| (d) | Heated above 150° C. and then gradually cooled below 45° C. | Not heated | B = scattering R = scattering |

Figures 4A, 4B, 4C:
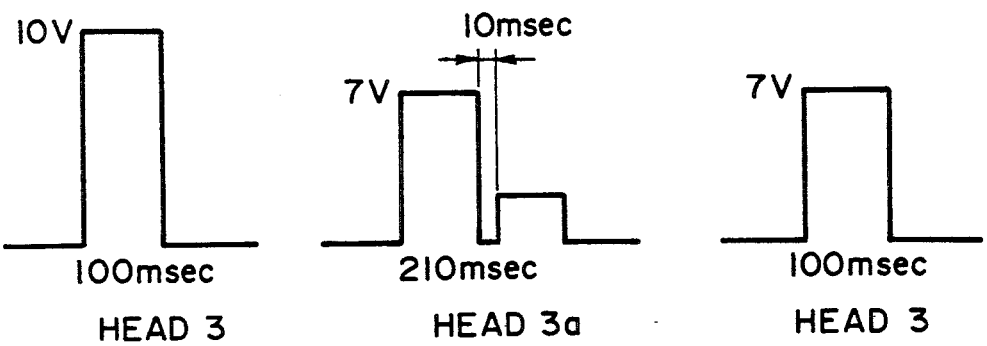
FIGS. 4A–4C are diagrams showing drive pulses applied to thermal heads used in Example 1.

The control of rapid cooling or gradual cooling by the thermal heads was effected by controlling voltage pulses applied to the thermal heads, for example as shown in FIG. 4A showing a pulse applied to the head 3 in mode (a), FIG. 4B showing pulses applied to the head 3a in mode (b) and FIG. 4C showing a pulse applied to the head 3 in mode (c).

Figure 5:
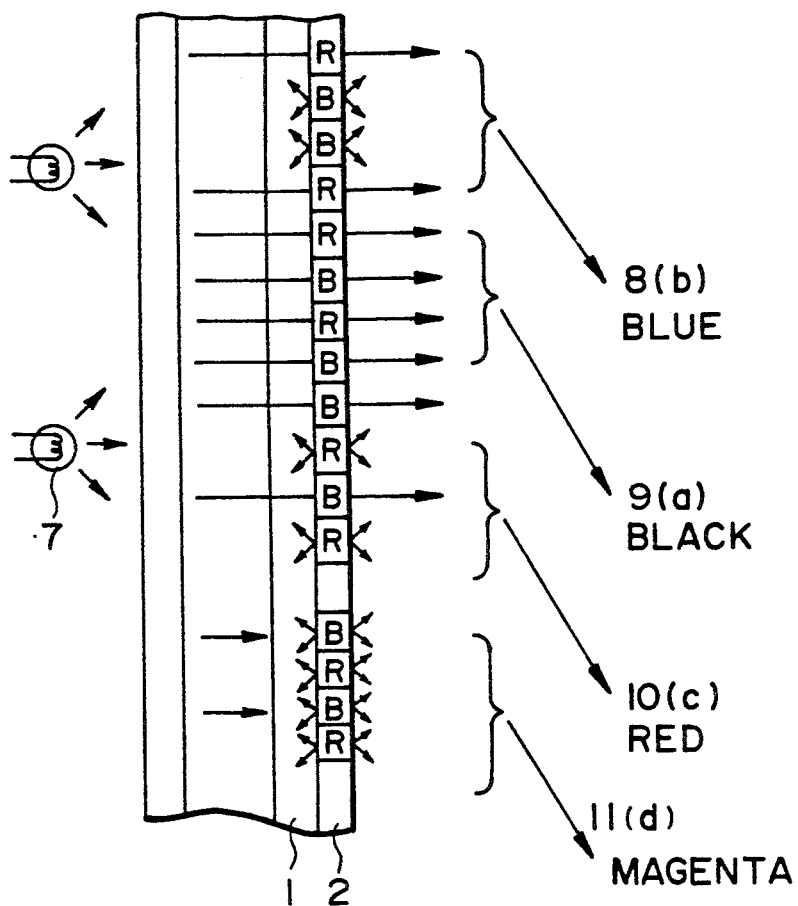
FIG. 5 is a schematic side view of a display apparatus including the polymer liquid crystal device of Example 1.

As shown in FIG. 5, the thus recorded polymer liquid crystal device having the substrate 1 and the polymer liquid crystal layer 2 was disposed in parallel with a Fresnel lens 6 and illuminated with backlights 7 for display with scattered light, whereby a scattered light image with good reproduction of desired colors including selected blue 8 (from a recorded part by mode (b)), black 9 (mode (a)), selected red 10 (mode (c)) and mixed color of magenta 11 (mode (d)).

Then, the whole area of the device was heated to above 150° C. and gradually cooled below 45° C., whereby the polymer liquid crystal layer 2 was erased into a uniform scattering state.

EXAMPLE 2

A dichroic dye (LSR-405, mfd. by Mitsubishi Kasei K.K.) was mixed similarly as in Example 1 in a proportion of 2 wt. % with a polymer liquid crystal of the following formula (III):

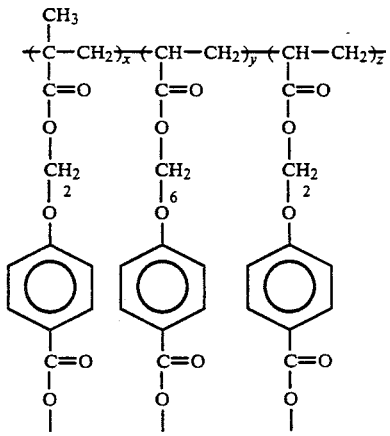

(III)

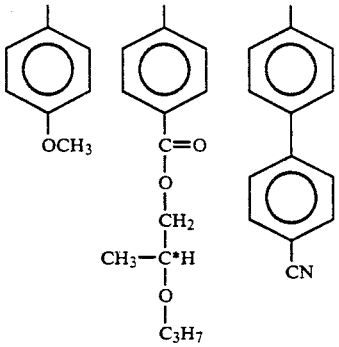

$x:y:z = 3:6:1$ $$g \xrightarrow{26° C.} N* \xrightarrow{81° C.} Iso.$$

As a result, a red polymer liquid crystal composition was obtained.

Further, a green polymer liquid crystal composition was prepared by mixing dichroic colorants LSB-335 and LSY-116 (respectively mfd. by Mitsubishi Kasei K.K.) each in a proportion of 1 wt. % with a polymer liquid crystal (IV) represented by the formula (X) shown below wherein x:y:z=4:4:2 and showing a phase transition series of:

$$g \xrightarrow{38° C.} N* \xrightarrow{98° C.} Iso.$$

A blue polymer liquid crystal composition was prepared by mixing a dichroic colorant LSB-278 (mfd. by Mitsubishi Kasei K.K.) in a proportion of 2 wt. % with a polymer liquid crystal (V) also represented by the formula (X) wherein x:y:z=3.5:3.5:3 and showing a phase transition series of:

$$g \xrightarrow{35° C.} N* \xrightarrow{108° C.} Iso.$$

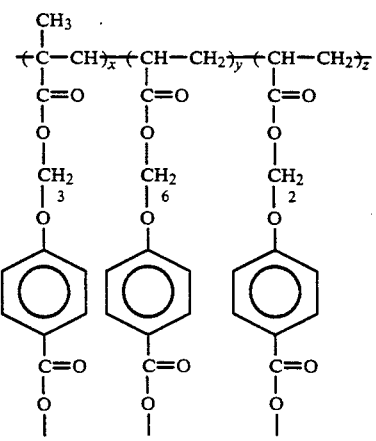

(X)

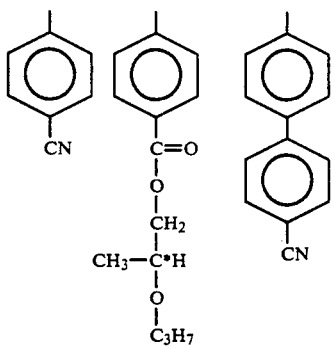

The thus obtained three color polymer liquid crystal compositions were respectively pulverized and classified to obtain three types of color particles each having a number-average particle size of 8 μm. The resultant red, green and blue particles were blended in a weight ratio of 1.6:1:1.3. The blend particles were applied by electrostatic spraying onto a 50 μm-thick polyester film to form a single coating layer.

Figure 6:
FIG. 6 is a schematic sectional view of a polymer liquid crystal device of Example 2.
Figure 7:
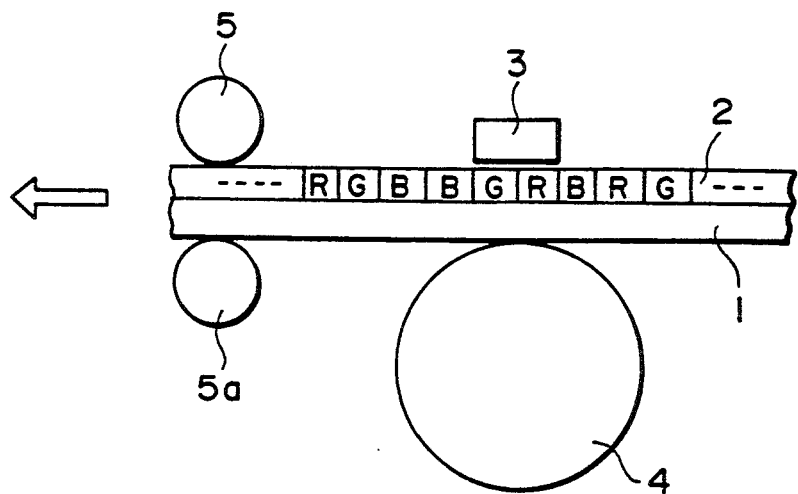
FIG. 7 is a schematic side view of a recording apparatus including the polymer liquid crystal device of Example 2.

Then, the pressure-bonding of the particles onto the polyester film was performed similarly as in Example 1, thereby to obtain a polymer liquid crystal device as shown in FIG. 6 wherein the polyester film 1 was coated with a color polymer liquid crystal layer 2 in which red (R), green (G) and blue (B) elements were arranged at random.

The resultant polymer liquid crystal device was subjected to image formation in a system including a line thermal head 3, a platen roller 4, and feed rollers 5 and 5a. More specifically, the polymer liquid crystal layer 2 was supplied with controlled temperature changes as shown in FIG. 8 to selectively change the light-scattering intensities of the three color polymer liquid crystal elements.

Figure 8:
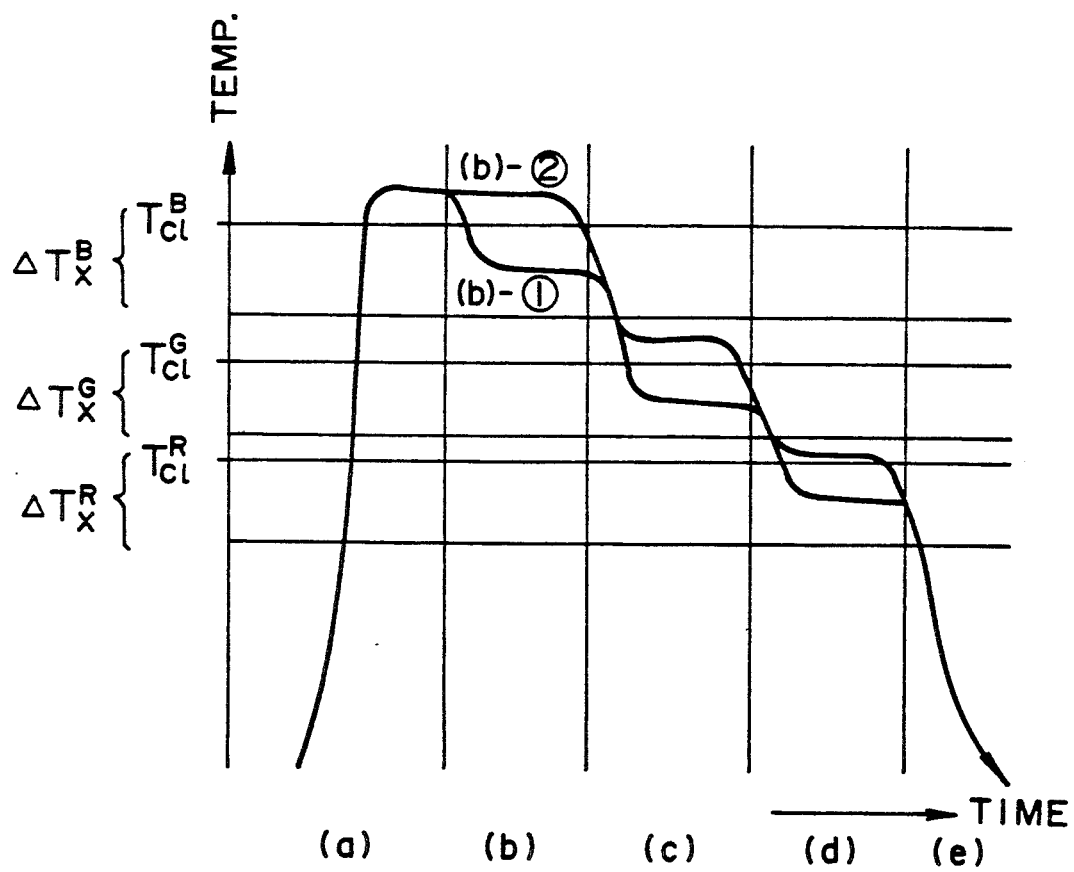
FIG. 8 is a graph showing patterns of temperature change applied to the polymer liquid crystal layer in the device of Example 2.

Referring to the temperature-changing curves shown in FIG. 8, in an initialization region (a), all the color elements were heated above their Tcl (N*-Iso transition temperatures) to be uniformly made transparent. Then, in a subsequent region (b) for determining the recording state of the blue polymer liquid crystal elements having the highest $Tcl^B$, a blue polymer liquid crystal element gradually cooled in the liquid crystallization temperature range $\Delta Tx^B$ below $Tcl^B$ for the blue elements ($\Delta Tx^B << Tcl^B - Tg^B$, $Tcl^B - \Delta Tx^B > Tcl^G$, $Tcl^R$) along a curve (b) - ① in FIG. 8 was changed into a light-scattering state, and a blue element rapidly cooled in the liquid crystallization temperature range $\Delta Tx^B$ along a curve (b) - ② was retained in a transparent state.

At this time, the green and red polymer liquid crystal elements were retained in the respective transparent states without change. Then, in the regions (c) and (d), the recording states of the respective green and red elements were successively determined, and then in the region (e), the entire polymer liquid crystal medium was cooled to room temperature.

The thus recorded polymer liquid crystal device was subjected to scattered light display similarly as in Example 1, whereby a color image was displayed with good reproduction of mixture colors as well as selective red, green and blue colors.

COMPARATIVE EXAMPLE 1

Example 2 was repeated excepted that the red, green and blue polymer liquid crystal particles were blended in weight ratios of 1:1:1.

The resultant display image showed a resolution almost identical to that in Example 2 but was bluish as a whole because of the lesser number of red elements compared with Example 2.

COMPARATIVE EXAMPLE 2

Comparative Example 1 was repeated except that the dichroic colorant LSR-405 (mfd. by Mitsubishi Kasei K.K.) was used in an increased proportion of 8 wt. %.

The resultant display image still provided a bluish tint as a whole. This is presumably because the increased colorant concentration caused a lowering in liquid crystallinity of the polymer liquid crystal, more specifically a lowering in birefringence of the red polymer liquid crystal elements, to result in a lower scattering intensity of the red elements than in Example 2.

EXAMPLE 3

Figure 9:
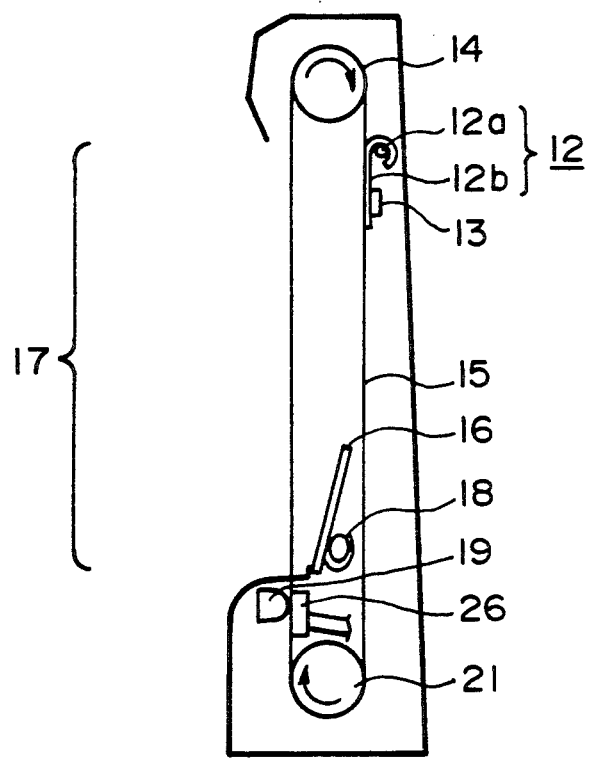
FIG. 9 is a schematic side view of another display apparatus including a polymer liquid crystal device according to the present invention.

The polymer liquid crystal device of the present invention may be prepared in the form of an image-forming belt 15 as shown in FIG. 9 which may be a laminate of a substrate 1 and a polymer liquid crystal layer 2 formed thereon as shown in FIG. 2 or such a polymer liquid crystal layer 2 alone.

Referring to FIG. 9, the image-forming belt 15 may be incorporated in a display apparatus as shown which comprises an erasure heater 12 including a halogen lamp 12a and a resistive heater 12b, a temperature sensor 13, a drive roller 14, a Fresnel lens 16, a display zone 17, a light source 18, a platen 19, a thermal head 20 and a mating roller 21. The display apparatus is functionally separated into a writing unit (19, 20), an erasure unit (12, 13) and a light source (18).

As described above, according to the present invention, there is provided a polymer liquid crystal device for display with scattered light comprising a substrate and a plurality of minute color polymer liquid crystal elements comprising plural species of polymer liquid crystals colored in at least two colors and disposed in a layer on the substrate, wherein a color of the polymer liquid crystal elements scattering the longest wavelength light are disposed in a larger areal proportion than the other colors of polymer liquid crystal. As a result, differences in visual sensitivity, scattering intensity and scattering angle during scattered light display can be compensated in a simple manner, whereby display images with a good reproduction of color tone are obtained.

What is claimed is:

1. A polymer liquid crystal device, comprising:
   a color polymer liquid crystal layer comprising a plurality of minute polymer liquid crystal elements, said polymer liquid crystal elements comprising plural species of polymer liquid crystals colored in at least two colors and disposed in a prescribed planar pattern wherein said different colors of polymer liquid crystal elements comprise said different species of polymer liquid crystals, whereby the polymer liquid crystal elements scatter or transmit light incident thereto in intensities depending on selectively and thermally controllable states of the polymer liquid crystal elements to effect a display in which different colors of polymer liquid crystal elements scatter or transmit different wavelengths of light including light of a longest wavelength and light of a shorter wavelength; wherein a color of the polymer liquid crystal elements scattering or transmitting the longest wavelength light are disposed in a larger areal proportion than the other color of the polymer liquid crystal elements scattering or transmitting the shorter wavelength light.

2. A device according to claim 1, wherein said color polymer liquid crystal layer is disposed on a substrate.

3. A device according to claim 2, wherein said polymer liquid crystal elements comprise three species of polymer liquid crystals colored in blue, green and red, respectively, and the red polymer liquid crystal elements are disposed in a larger areal proportion than the green and blue polymer liquid crystal elements.

4. A device according to claim 3, wherein the green polymer liquid crystal elements are disposed in a smaller areal proportion than the blue polymer liquid crystal elements.

5. A device according to claim 2, wherein the color polymer liquid crystals respectively comprise a polymer liquid crystal and a dye or pigment added thereto.

6. A device according to claim 5, wherein said dye or pigment is added in a proportion of 0.01–30 wt. % with respect to the polymer liquid crystal.

7. A device according to claim 5, wherein said dye or pigment is added in a proportion of 0.1–20 wt. % with respect to the polymer liquid crystal.

8. A device according to claim 5, wherein said dye or pigment is added in a proportion of 0.1–10 wt. % with respect to the polymer liquid crystal.

9. A device according to any of claims 5–7, wherein the dyes or pigments are contained in substantially the same proportion in the respective color polymer liquid crystals.

10. A device according to claim 9, wherein the proportions of the dyes or pigments in the respective color polymer liquid crystals are within ±5% from each other.

11. A device according to claim 1, wherein said polymer liquid crystal elements comprise three species of polymer liquid crystals colored in blue, green and red, respectively, and the red polymer liquid crystal elements are disposed in a larger areal proportion than the green and blue polymer liquid crystal elements.

12. A device according to claim 11, wherein the green polymer liquid crystal elements are disposed in a smaller areal proportion than the blue polymer liquid crystal elements.

13. A device according to claim 1, wherein the color polymer liquid crystals respectively comprise a polymer liquid crystal and a dye or pigment added thereto.

14. A device according to claim 13, wherein said dye or pigment is added in a proportion of 0.01–30 wt. % with respect to the polymer liquid crystal.

15. A device according to claim 13, wherein said dye or pigment is added in a proportion of 0.1–20 wt. % with respect to the polymer liquid crystal.

16. A device according to claim 13, wherein said dye or pigment is added in a proportion of 0.1–10 wt. % with respect to the polymer liquid crystal.

17. A device according to any of claims 13–16, wherein the dyes or pigments are contained in substantially the same proportion in the respective color polymer liquid crystals.

18. A device according to claim 17, wherein the proportions of the dyes or pigments in the respective color polymer liquid crystals are within ±5% from each other.

19. A display apparatus, comprising:

a polymer liquid crystal device comprising a color polymer liquid crystal layer comprising a plurality of minute polymer liquid elements, said polymer liquid crystal elements comprising plural species of polymer liquid crystals colored in at least two colors and disposed in a prescribed planar pattern, wherein said different colors of polymer liquid crystal elements comprise said different species of polymer liquid crystals, whereby the polymer liquid crystal elements scatter or transmit light incident thereto in intensities depending on selectively and thermally controllable states of the polymer liquid crystal elements to effect a display in which different colors of polymer liquid crystal elements scatter or transmit different wavelengths of light including light of a longest wavelength and light of a shorter wavelength; wherein a color of the polymer liquid crystal elements scattering or transmitting the longest wavelength light are disposed in a larger areal proportion than the other color of the polymer liquid crystal elements scattering or transmitting the shorter wavelength light, said display apparatus further comprising:

a light source; and a heat-application means.

20. An apparatus according to claim 19, wherein said polymer liquid crystal device comprises the color polymer liquid crystal layer disposed on a substrate.

21. An apparatus according to claim 20, wherein said heat-application means includes a writing means and an erasure means.

22. An apparatus according to claim 21, wherein said writing means comprises a thermal head.

23. An apparatus according to claim 21, wherein said erasure means comprises an erasure heater and a temperature sensor.

* * * * *

UNITED STATES PATENT AND TRADEMARK OFFICE
CERTIFICATE OF CORRECTION

PATENT NO. : 5,144,464

DATED : September 1, 1992

INVENTOR(S) : TOSHIKAZU OHNISHI, ET AL.

Page 1 of 3

It is certified that error appears in the above-identified patent and that said Letters Patent is hereby corrected as shown below:

IN [57] ABSTRACT

Line 12, "wavelength" should read --wavelength of--.
Line 13, "are" should read --is--.

COLUMN 1

Line 5, "Jun. 5, 1990," should read --Jun. 15, 1990,--.

COLUMN 2

Line 4, "are" should read --is--.

COLUMN 5

Line 50, ".The" should read --The--.

COLUMN 7

Line 55, "liwuid" should read --liquid--.

COLUMN 8

Line 18, "$CH_3$" should read --$OCH_3$--.

UNITED STATES PATENT AND TRADEMARK OFFICE
CERTIFICATE OF CORRECTION

PATENT NO. : 5,144,464

DATED : September 1, 1992

INVENTOR(S) : TOSHIKAZU OHNISHI, ET AL.

It is certified that error appears in the above-identified patent and that said Letters Patent is hereby corrected as shown below:

COLUMN 9

Line 58, "$\begin{array}{ccc} | & | & | \\ CH_2 & CH_2 & CH_2 \\ |_2 & |_6 & |_2 \end{array}$" should read $--\begin{array}{ccc} \overset{\displaystyle\mid}{\underset{\displaystyle\mid}{C}}H_2 & \overset{\displaystyle\mid}{\underset{\displaystyle\mid}{C}}H_2 & \overset{\displaystyle\mid}{\underset{\displaystyle\mid}{C}}H_2 \\ _2 & _6 & _2 \end{array}--.$

COLUMN 10

Line 58, "$\begin{array}{ccc} | & | & | \\ CH_2 & CH_2 & CH_2 \\ |_2 & |_6 & |_2 \end{array}$" should read $--\begin{array}{ccc} \overset{\displaystyle\mid}{\underset{\displaystyle\mid}{C}}H_2 & \overset{\displaystyle\mid}{\underset{\displaystyle\mid}{C}}H_2 & \overset{\displaystyle\mid}{\underset{\displaystyle\mid}{C}}H_2 \\ _3 & _6 & _2 \end{array}--.$

COLUMN 13

Line 5, "are" should read --is--.

UNITED STATES PATENT AND TRADEMARK OFFICE
CERTIFICATE OF CORRECTION

PATENT NO. : 5,144,464

DATED : September 1, 1992

INVENTOR(S) : TOSHIKAZU OHNISHI, ET AL.

It is certified that error appears in the above-identified patent and that said Letters Patent is hereby corrected as shown below:

COLUMN 14

Line 37, "are" should read --is--.

Signed and Sealed this

Twenty-third Day of November, 1993

Attest:

BRUCE LEHMAN

Attesting Officer       Commissioner of Patents and Trademarks